US008499287B2

(12) United States Patent
Shafi et al.

(10) Patent No.: US 8,499,287 B2
(45) Date of Patent: Jul. 30, 2013

(54) ANALYSIS OF THREAD SYNCHRONIZATION EVENTS

(75) Inventors: Hazin Shafi, Redmond, WA (US); Brian Adelberg, Issaquah, WA (US); Maria Blees, Seattle, WA (US); Paulo Janotti, Issaquah, WA (US); Khaled Sedky, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1235 days.

(21) Appl. No.: 12/143,863

(22) Filed: Jun. 23, 2008

(65) Prior Publication Data

US 2009/0319996 A1 Dec. 24, 2009

(51) Int. Cl.
*G06F 9/44* (2006.01)

(52) U.S. Cl.
USPC .......................................................... 717/125

(58) Field of Classification Search
None
See application file for complete search history.

(56) References Cited

U.S. PATENT DOCUMENTS

| | | | | |
|---|---|---|---|---|
| 5,682,328 | A * | 10/1997 | Roeber et al. | 702/187 |
| 5,794,047 | A * | 8/1998 | Meier | 717/133 |
| 6,226,787 | B1 * | 5/2001 | Serra et al. | 717/125 |
| 6,785,893 | B2 * | 8/2004 | Morris et al. | 719/318 |
| 7,272,820 | B2 | 9/2007 | Klianev | |
| 7,343,563 | B2 | 3/2008 | Muratori et al. | |
| 7,346,902 | B2 | 3/2008 | Dutt et al. | |
| 2005/0283765 | A1 | 12/2005 | Warren et al. | |
| 2007/0043861 | A1 | 2/2007 | Baron et al. | |
| 2007/0169124 | A1 | 7/2007 | Kershenbaum et al. | |
| 2007/0271562 | A1 | 11/2007 | Schumacher et al. | |
| 2008/0005737 | A1 | 1/2008 | Saha et al. | |
| 2008/0005742 | A1 | 1/2008 | Ma | |
| 2008/0276252 | A1 * | 11/2008 | Pronovost et al. | 719/318 |
| 2010/0318852 | A1 * | 12/2010 | Zheng et al. | 714/37 |
| 2011/0258608 | A1 * | 10/2011 | Li et al. | 717/127 |
| 2012/0256751 | A1 * | 10/2012 | Nallabelli et al. | 340/636.1 |

OTHER PUBLICATIONS

Mehner, et al., "Visualizing the Synchronization of Java-Threads with UML", 2000, 9 pages.
Attali, et al., "Graphical Visualization of Java Objects, Threads, and Locks", 2007, 25 pages.
Broberg, et al., "VPPB—A Visualization and Performance Prediction Tool for Multithreaded Solaris Programs", 1998, 7 pages.

* cited by examiner

*Primary Examiner* — Li B Zhen
*Assistant Examiner* — Evral Bodden
(74) *Attorney, Agent, or Firm* — Ogilvie Law Firm

(57) ABSTRACT

Thread blocking synchronization event analysis software uses kernel context switch data and thread unblocking data to form a visualization of thread synchronization behavior. The visualization provides interactive access to source code responsible for thread blocking, identifies blocking threads and blocked threads, summarizes execution delays due to synchronization and lists corresponding APIs and objects, correlates thread synchronization events with application program phases, and otherwise provides information associated with thread synchronization. The visualization may operate within an integrated development environment.

20 Claims, 4 Drawing Sheets

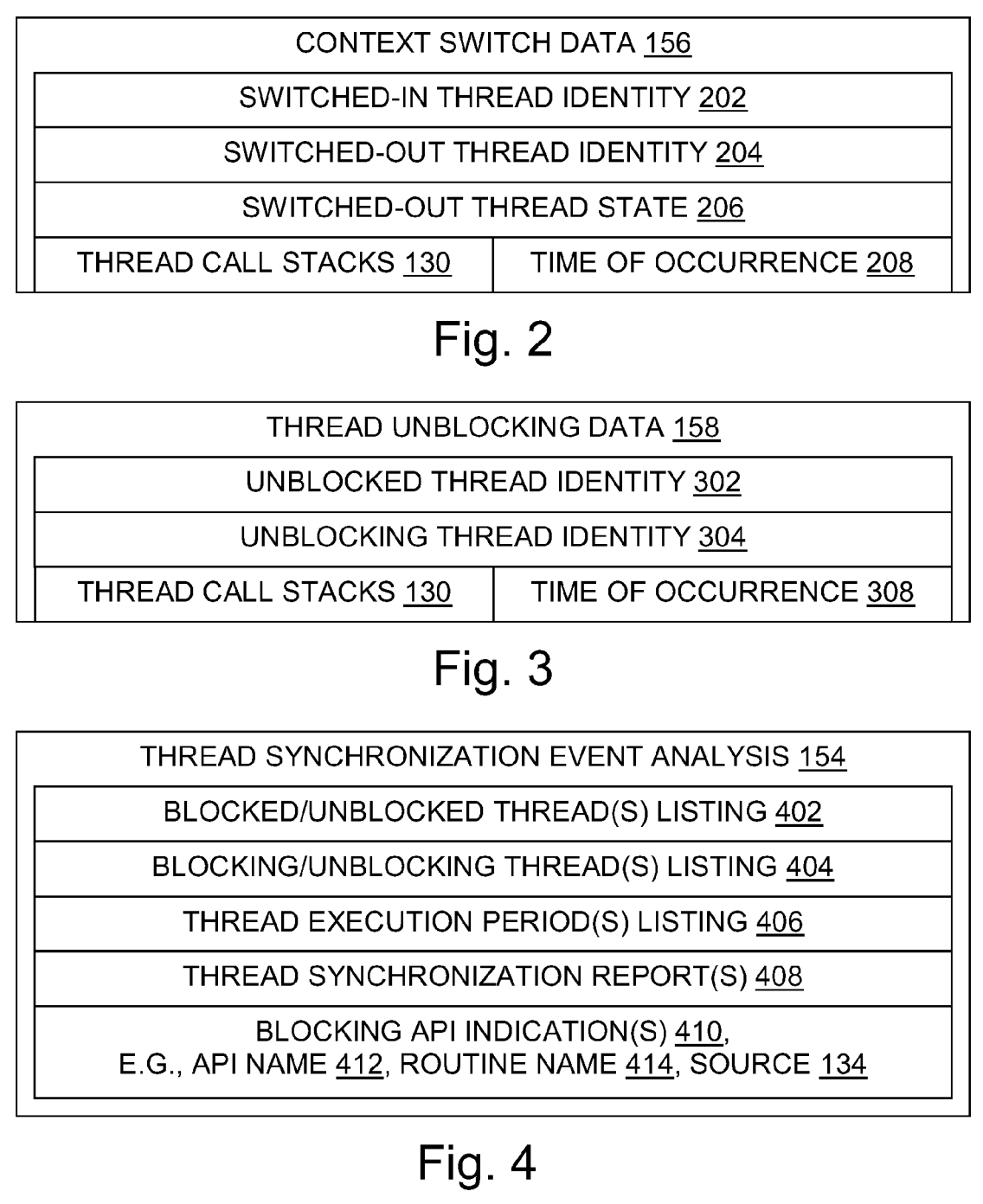

| CONTEXT SWITCH DATA 156 | |
|---|---|
| SWITCHED-IN THREAD IDENTITY 202 | |
| SWITCHED-OUT THREAD IDENTITY 204 | |
| SWITCHED-OUT THREAD STATE 206 | |
| THREAD CALL STACKS 130 | TIME OF OCCURRENCE 208 |

Fig. 2

| THREAD UNBLOCKING DATA 158 | |
|---|---|
| UNBLOCKED THREAD IDENTITY 302 | |
| UNBLOCKING THREAD IDENTITY 304 | |
| THREAD CALL STACKS 130 | TIME OF OCCURRENCE 308 |

Fig. 3

| THREAD SYNCHRONIZATION EVENT ANALYSIS 154 |
|---|
| BLOCKED/UNBLOCKED THREAD(S) LISTING 402 |
| BLOCKING/UNBLOCKING THREAD(S) LISTING 404 |
| THREAD EXECUTION PERIOD(S) LISTING 406 |
| THREAD SYNCHRONIZATION REPORT(S) 408 |
| BLOCKING API INDICATION(S) 410, E.G., API NAME 412, ROUTINE NAME 414, SOURCE 134 |

Fig. 4

ANALYSIS OF THREAD SYNCHRONIZATION EVENTS

BACKGROUND

Software developers use a variety of software tools when creating or modifying software programs. For example, a source code analyzer is a tool used to check a program's source code for inconsistencies, such as reading an uninitialized variable or using a structure after freeing the memory allocated to the structure. A compiler is a tool used to translate a program's source code into executable code. A version controller is a tool used to manage different versions of source code and/or different versions of executable code. A debugger is a tool used to test and debug other programs. A profiler is a tool used to measure consumption of resources by a program, such as processor cycles and memory.

Some software development tools have been gathered into an integrated development environment (IDE). An IDE is itself a software tool, which provides various other tools for software development in a coordinated manner. For example, a typical IDE includes at least a source code editor, a compiler and/or an interpreter, and a debugger. Some IDEs include a version controller, tools to automate building a complete program from libraries and other components, and/or tools to help create a graphical user interface. Some IDEs also have a class browser, an object inspector, and/or other tools designed specifically to help develop object oriented programs. IDEs are designed to improve developer productivity by providing coordinated tools that have similar user interfaces. An IDE may be tailored for use with a particular programming language, but some IDEs, such as the Microsoft® Visual Studio® integrated development environment (marks of Microsoft Corporation), support development in several programming languages.

SUMMARY

Some embodiments may be used by a developer to help analyze thread synchronization events. A thread blocking synchronization event analysis is based on determinations made using context switch data from a kernel thread scheduler and kernel-level thread unblocking data. Context switch data may include a switched-in thread identity, a switched-out thread identity, a switched-out thread state, at least one thread call stack, and a context switch time of occurrence. Thread unblocking data may include an unblocked thread identity, an unblocking thread identity, at least one thread call stack, and an unblocking synchronization event time of occurrence.

Some embodiments provide a visualization of the thread synchronization event analysis to help developers understand thread synchronization in their programs. For example, the visualization may give a developer interactive access to source code responsible for a thread blocking synchronization event. The visualization may provide an identification of a blocking thread which holds a synchronization object that is blocked on in a thread blocking synchronization event. The visualization may correlate thread synchronization event occurrence times with an instrumentation of an application program. The visualization may visibly link an unblocking event and a thread which is unblocked by the event, and show how much time passed between the unblocking event and the time the unblocked thread resumed execution. The visualization may include a report summarizing the amount of time a thread is blocked, subdivided by synchronization object category or call stack. Within the visualization, different colors may correspond to different thread synchronization event categories. In some embodiments, the visualization is integrated with an integrated development environment.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 2 is a block diagram further illustrating context switch data shown in FIG. 1;

FIG. 3 is a block diagram further illustrating thread unblocking data shown in FIG. 1;

FIG. 4 is a block diagram further illustrating a thread synchronization event analysis shown in FIG. 1;

DETAILED DESCRIPTION

Overview

Figure 1:
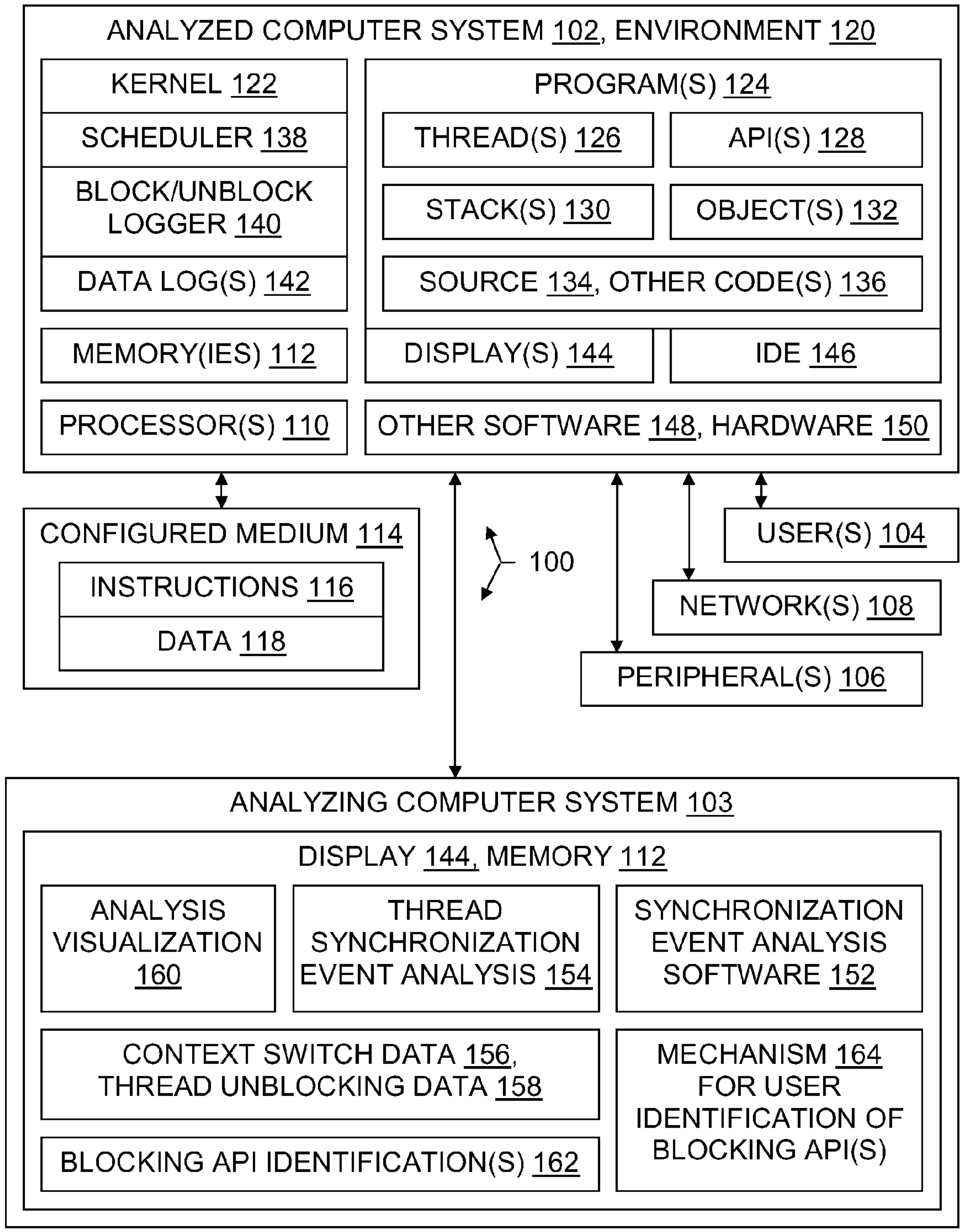
FIG. 1 is a block diagram illustrating an analyzed computer system and an analyzing computer system in an operating environment, and also illustrating configured storage medium embodiments.

Synchronization overheads can significantly reduce performance in parallel programs, such as programs that use threads. Synchronization also makes programs more complex, increasing the risk of programming errors. Efforts have been made to help developers understand synchronization.

Some efforts rely on instrumentation, namely, instructions inserted in a program specifically for debugging and/or profiling. However, an instrumented program may behave quite differently than its non-instrumented (and possibly released) version, due to the instrumentation itself. Instrumentation may also fail to provide accurate measures of program performance, due to program code and/or kernel code that is executed between the tracked event and the inserted instrumentation.

Some embodiments described herein help developers correlate thread synchronization with program constructs to improve performance. For example, a visualization exposes synchronization blocking events and associated information such as blocking Application Program Interface (API) names, thread identities, source code, and blocking times.

Some embodiments obtain synchronization data for a visualization by using kernel events, instead of relying on user instrumentation. By using kernel events, an embodiment may reduce runtime overhead and trace file size, and may be more accurate as to when blocking events occur during thread context switches, in comparison with some instrumented approaches. In addition, some embodiments report inter-thread synchronization dependencies, e.g., which thread unblocks another thread, based on data from kernel events.

Some embodiments support synchronization analysis of managed code. In some embodiments, a combination of kernel events and call stack walks permits a visualization to list the APIs that resulted in blocking application threads. The blocking APIs can be identified for native code and/or for managed code, on a per thread basis or across a process or group of threads.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "kernel" is low-level code which supports execution of applications, and in particular which schedules threads. Some examples of kernels include runtime systems, hypervisors, and operating systems.

Whenever reference is made to data or instructions, it is understood that these items configure a computer-readable memory, as opposed to simply existing on paper, in a programmer's mind, or as a transitory signal on a wire, for example.

Operating Environments

With reference to FIG. 1, an operating environment 100 for an embodiment may include, for instance, an analyzed computer system 102 and an analyzing computer system 103. The analyzed computer system 102 is a computer system on which threads have run, or are running, and the synchronization behavior of those threads is a subject of interest to a developer. The analyzing computer system 103 is a computer system on which the developer reviews results of analysis of the synchronization behavior. The analyzed computer system 102 and the analyzing computer system 103 are shown as separate systems in FIG. 1 to make it clear that data obtained from a program running on one system may be analyzed on another system, but in some embodiments the analyzed computer system 102 and the analyzing computer system 103 are one and the same computer system. That is, thread synchronization of a program may be studied on the same system that ran/runs the program and/or on another system.

The analyzed computer system 102 may be a multiprocessor computer system, or not. The analyzing computer system 103 may be multithreaded or not, and may be multiprocessor or not. The term "thread" should be understood to include any code capable of or subject to synchronization, and may also be known by another name, such as "task," "process," or "coroutine," for example.

An operating environment may include one or more computer systems, which may be clustered, client-server networked, and/or peer-to-peer networked. Some operating environments include a stand-alone (non-networked) computer system.

Human users 104 may interact with the computer system(s) 102, 103 or with another computer system in an embodiment by using displays 144, keyboards, and other peripherals 106. A software developer is understood to be a particular type of user 104; end-users are also considered users 104. Storage devices and/or networking devices may be considered peripheral equipment in some embodiments. Other computer systems (not shown) may interact with the computer system(s) 102, 103 or with another system embodiment using one or more connections to a network 108 via network interface equipment, for example.

The computer system 102 (and computer system 103 if the analyzed and analyzing roles are given to two systems) includes at least one logical processor 110. The computer system(s) 102, 103, like other suitable systems, also include one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. It will be understood that memories 112 may be of different physical types, and that programs 124, visualizations 160, and other items shown in the Figures may reside partially or entirely within one or more memories 112, thereby configuring those memories.

In a given operating environment 100, whether within a managed code multi-threaded environment 120 or otherwise, one or more operating systems, hypervisors, or other kernels 122 will generally be present. The analyzed computer system 102 is configured with and/or runs one or more software programs 124 which may contain static or runtime components including threads 126, routines accessed though APIs 128, call stacks 130, class instances and other objects 132, source 134 codes, and other codes 136 such as virtual machine executables and native code executables. A scheduler 138 in the kernel schedules threads 126 for execution on one or more processors 110. Other software 148 and hardware 150 other than that already enumerated may also be present.

The illustrated configuration includes an Integrated Development Environment (IDE) 146 which provides a developer with a set of coordinated software development tools. In particular, some of the suitable operating environments for some embodiments include a Microsoft® Visual Studio® development environment (marks of Microsoft Corporation) configured to support synchronization analysis according to the teachings herein. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs.

Thread Synchronization Generally

Blocking, synchronization, and context switches are distinct but related concepts. For example, a context switch may occur for synchronization or for other reasons. One interest herein is identifying instances of context switches that involve blocking on synchronization objects. A thread 126 may also block on other operations, such as file I/O, network I/O, page faults, and faulting on a DLL load event. To disambiguate synchronization blocks from other blocks, some embodiments look for known synchronization blocking APIs 128 in call stacks 130 upon a context switch. Every blocking synchronization event has a blocking API.

A synchronization event may occur without a context switch, e.g., a thread may successfully acquire a synchronization object 132 without incurring a context switch. When a thread 126 wants to acquire a synchronization object 132 (e.g., a lock), the thread may acquire the object without blocking if the object is free. If the object is not free, the thread has two choices: polling/spin waiting, which is wasteful, or blocking and relinquishing the processor 110 so that other threads may execute while the thread waits for the object to be freed.

Each blocking synchronization event involves a blocking thread and a blocked thread. Similarly, each unblocking synchronization event involves an unblocking thread and an unblocked thread. The blocking thread and the unblocking thread are the same thread at different times. Similarly, the blocked thread and the unblocked thread are the same thread at different times. For example, assume a thread X acquires a lock and is doing some work. A thread Y comes along and attempts to acquire the same lock, but ends up blocking. The blocked thread is Y and the blocking thread is X. When X completes its work and releases the lock, it will indirectly unblock thread Y; now thread X is the unblocking thread and thread Y is the unblocked thread.

One item associated with a synchronization event is a synchronization object 132. Examples of synchronization objects 132 include a mutex, a semaphore, a critical section, and an application program event for synchronization. A given embodiment does not necessarily track the identity of the object (e.g., its address or handle). The embodiment may report where in the code a program 124 was performing a synchronization that ended up stalling a thread 126. A developer may also be able to determine the identity of the object 132 in question by examining the code. Every synchronization event has at least one associated synchronization object 132, and an event may have multiple associated synchronization objects, e.g., via a method such as Microsoft's WaitForMultipleObjects( ) method which uses an array of synchronization object handles.

Systems Generally

Referring now to FIGS. 1 through 4, some embodiments provide an analyzing computer system 103 configured to assist synchronization analysis of a program 124 which contains threads 126 that executed on an analyzed computer system 102. In some embodiments, the analyzing computer system 103 also runs the threads 126, and thus serves both as the analyzed computer system 102 and the analyzing computer system 103. Each system includes memory 112, and at least one logical processor 110 in operable communication with the memory. Thread synchronization events analyzed by embodiments discussed herein do not necessarily require a multiprocessor system. A display 144 is in operable communication with the memory and the processor(s). Data logs 142, in the form of one or more files or data streams, for example, include thread context switch data 156 produced by a kernel thread scheduler 138 and kernel thread unblocking data 158 produced by a block/unblock logger 140.

Using the data logs 142, synchronization event analysis software 152 produces a thread synchronization event analysis 154. The analysis 154 may take the form of data structures configuring memory (display memory and/or other memory). In particular the analysis may include a visualization 160 of the thread context switch data and the thread unblocking data. The visualization 160 configures the display 144, shows thread blocking and thread unblocking synchronization events, and provides a developer with information about the synchronization events, such as which API(s) 128 are involved in blocking thread execution. Blocking API identifications 162 may take the form of API names, individual routine names, or instruction pointers into routines, for example. Some embodiments provide a mechanism 164 for developers to identify potential blocking APIs. Some embodiments provide a call stack with resolved symbols (e.g., module, function name, line number) to show developers where in the code blocking APIs were called, in case the developers want to change that code.

As illustrated in FIG. 2, context switch data 156 for a given context switch may include a switched-in thread identity 202, a switched-out thread identity 204, a switched-out thread state 206 (Ready or otherwise), at least one thread call stack 130, and a context switch time of occurrence 208. Each thread 126 may have its own call stack 130. In some embodiments, either thread's call stack may be used to determine whether a context switch involves synchronization blocking, because the call stack of either the incoming or outgoing thread is sufficient.

As illustrated in FIG. 3, thread unblocking data 158 for a given kernel thread unblocking synchronization event may include an unblocked thread identity 302, an unblocking thread identity 304, at least one thread call stack 130, and an unblocking synchronization event time of occurrence 308. Some embodiments require the call stack of the unblocking thread as part of the thread unblocking data 158, because the call stack of the unblocked thread was already collected by the embodiment in context switch data. The call stack of the unblocking thread may be used by an embodiment to show developers what the unblocking thread was doing when it unblocked the thread, which may help developers understand dependencies among threads.

As illustrated in FIG. 4, a thread synchronization event analysis 154 may include a listing 402 of blocked and/or unblocked threads, a listing 404 of blocking and/or unblocking threads, a listing 406 of thread execution periods, one or more thread synchronization reports 408, and blocking API indications 410 such as an API name 412, an API routine name 414, or an API source 134 listing.

Visualization Examples

Examples given within this document do not describe all possible embodiments. Embodiments are not limited to the specific displays, features, or scenarios provided herein. A given embodiment may include additional or different features, displays, mechanisms, and/or data structures, and may otherwise depart from the examples provided.

Figure 5:
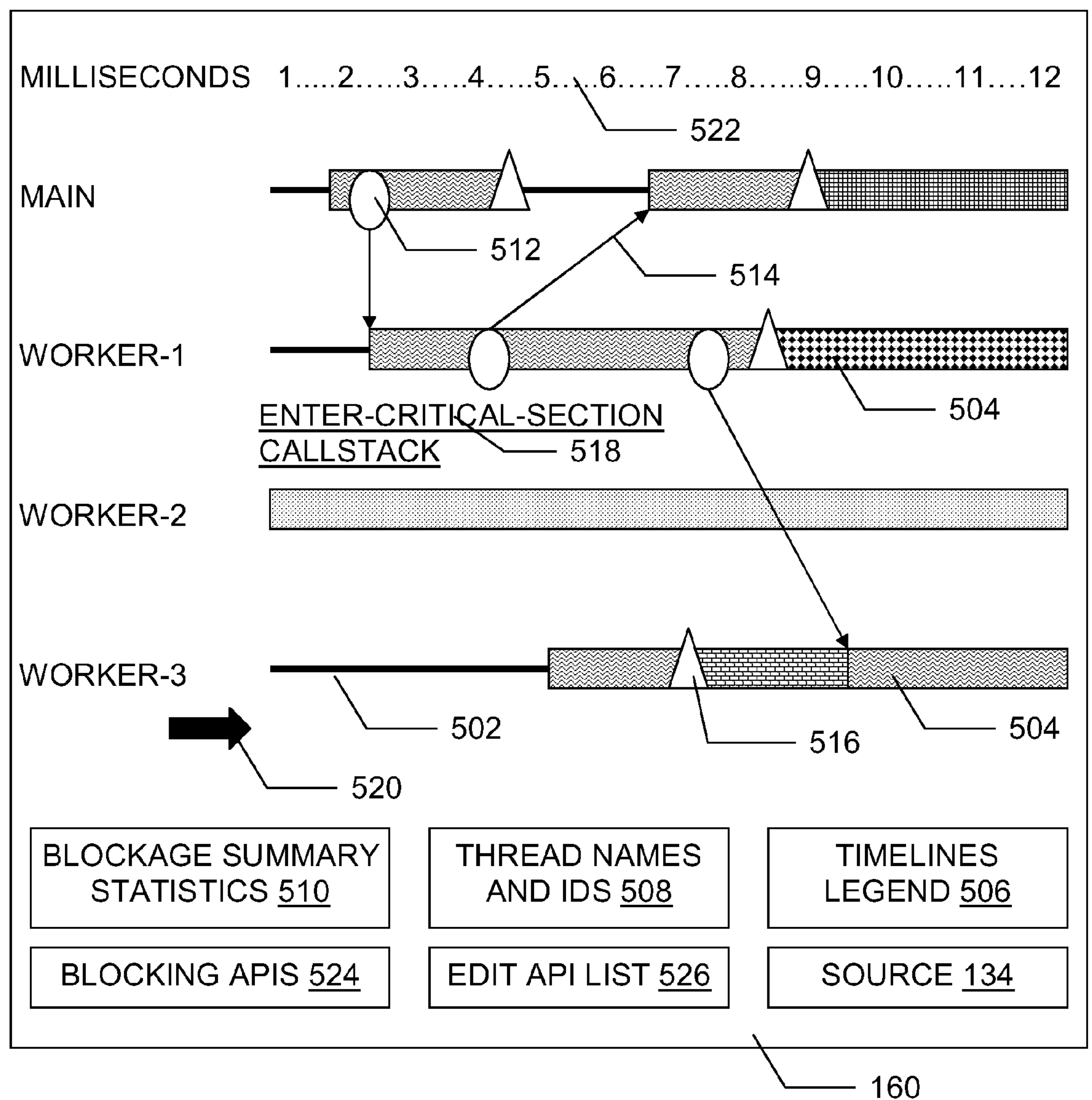
FIG. 5 is a diagram illustrating a visualization of a thread synchronization event analysis for display by an analyzing computer system.

Bearing in mind the foregoing caveats, we now consider specific visualization examples, beginning with a visualization 160 shown in FIG. 5. A reference timeline 522 in milliseconds appears at the top of the visualization, but it will be appreciated that the positions of the reference timeline and other graphic elements shown in this example may differ in other visualizations 160. Indeed, graphic elements shown in FIG. 5 need not necessarily appear at all in other visualizations.

Execution timelines 502 are displayed for four threads 126, designated as Main, Worker-1, Worker-2, and Worker-3. Different execution period icons 504 within a given execution timeline 502 appear in FIG. 5 as rectangles having different fill patterns, but in other visualizations 160 different execution periods appear in different colors; a combination of color, pattern, shape, position, sound, and/or other display characteristics may be used in a given visualization 160. The appearance options available for a given visualization 160 depend in part on the resolution and colors of the display 144 bearing the visualization, and in part on the graphics library used by the synchronization event analysis software 152 that creates/includes the visualization 160. In a color-coded visualization from which the monochrome visualization in FIG. 5 is derived ("the underlying visualization"), the following execution periods are shown in the indicated sequence:

Main: NE/term, Running, NE/term, Running, Event/Msg
Worker1: NE/term, Running, CS
Worker2: Idle/Preem
Worker3: NE/term, Running, User, Running In the FIG. 5 visualization, a timelines legend 506 section is provided to list the meaning of different execution period appearances. In the underlying visualization, which includes color-coded execution periods, for example, the timelines legend recites that different colors correspond to the following execution period types: Dark Blue=Running, Red=Event/Message (Event/Msg), Light Blue=blocked on Critical Section (CS), Yellow=Idle/Preempted (Idle/Preem) (the thread was not blocked but is idle because the kernel decided to stop it), Brown=Mutex, Purple=User, Thin Black Line=Not executing/Terminated (NE/term).

In the FIG. 5 visualization, a thread names and IDs 508 section is provided to list the thread names and respective thread IDs. In the underlying visualization, the thread names and IDs section recites:

| Name | ID |
|---|---|
| Main Thread | 1 |
| Worker Thread1 | 2 |
| Worker Thread2 | 15 |
| Worker Thread3 | 27 |

In the FIG. 5 visualization, a blockage summary statistics 510 section is provided to list synchronization statistics for the analyzed threads. In the underlying visualization, the blockage summary statistics 510 section recites:

| Blocking Cause | Fraction of Idle |
|---|---|
| CriticalSections | 45% |
| Events/Messages | 40% |
| User | 15% |
| Mutex | 0% |

In the FIG. 5 visualization, an oval icon 512 indicates an unblocking event by an unblocking thread, and a visible link 514 leads from the unblocking thread to the unblocked thread whose further execution was made possible by the unblocking event.

In the FIG. 5 visualization, a triangular icon 516 indicates the end of a Running execution period. By selecting the icon 516, additional information may be obtained, such as context switch data 156, blocking API indications 410, and/or source 134 code of the threads involved.

As indicated in the FIG. 5 visualization, information may also be available through textual icons. Textual icon 518 offers a developer access to information about the contents of call stacks 130 upon entry to a critical section such as the Critical Section indicated at the rightmost execution period of thread Worker-1. Icons 512, 516, 518, and other graphic elements which are selectable in a given embodiment (e.g., view slider bars; tabs; window position, zoom and other controls; menus; text I/O boxes; and the like) may be selected using a touch screen, light pen, mouse-controlled cursor 520, or other peripheral 106.

The visualization 160 shown in FIG. 5 and its underlying visualization are two of many possible examples. In some other example visualizations 160, not shown here, the only execution periods displayed are designated as Running, Synchronization, or nonexistent (a blank segment on a thread's execution timeline). In some visualizations, threads are labeled by an ID number and an executable code 136 file name. In some, Blocked-Blocker synchronization relationships are indicated by visible links between respective threads. In some, entries into critical sections are shown in textual icons with a corresponding memory address and an option for the developer to open a call stack in an editor. In some, execution period relative times are indicated along a horizontal axis but a numeric reference timeline 522 is not displayed.

In some visualizations, reference events may be generated by a program 124 using a routine of the analysis software 152. Corresponding vertical bars (or other graphics) are displayed in the visualization to help developers correlate thread synchronization with application program 124 phases.

Systems Continued

More generally, in some embodiments a visualization 160 configures a display 144 with an icon (e.g., icon 516) for a blocking event, and the system includes at least one source 134 code display routine in the analysis software 152 designed to display source code responsible for the blocking event after a user 104 selects the icon. For example, a synchronization visualization tool in an IDE 146 may present icons representing each blocking event; clicking on the icons reveals the source code responsible after that source is identified using call stacks at the blocking event.

In some embodiments, a visualization 160 configures a display 144 with a visible link between a blocking event and a thread 126 which holds a synchronization object 132 that is blocked on. In some embodiments, the visualization 160 configures the display 144 with a visible link between an unblocking event and a thread 126 which is unblocked by the event. In some, the visualization includes a reference timeline, accurate execution periods having screen sizes matching their respective durations, and/or another indication of how much time passed between the unblocking event and the thread resuming execution, and an optional display of a call stack of the unblocking thread. Thus, a link may be displayed from the unblocking event to the beginning of execution of the blocked thread with an icon showing blockage time, and showing time from the release operation until the thread resumed execution to reflect kernel scheduling overhead.

In some embodiments, a visualization 160 configures a display 144 with a report 408 summarizing the amount of time a thread is blocked, subdivided by at least one of: synchronization object category, call stack. A "synchronization object category" may include an individual synchronization object, a class of synchronization objects, a specific instance of synchronization in source code, or a user-defined group of such items. Some embodiments categorize in terms of APIs rather than object types, because multiple object types (e.g., Mutexes and events) use the same synchronization APIs (e.g., WaitForSingleObject( )). Reports 408 may include tables, charts, lists, text, and/or graphical elements. Reports 408 may be provided to summarize the amount of time a thread is blocked per class of synchronization object, with a feature to drill-down per synchronization class, e.g., by critical sections or monitors. Reports 408 may link specific instances of synchronization in source code to cumulative delay calculations. A report 408 is a specific kind of visualization 160; a visualization 160 may include graphics, text, or both, and is not necessarily interactive.

One embodiment of a report 408 includes a table with column headings CallStack, CriticalSection, Events, Mutexes, Semaphores, and UserDefined. Thread IDs and DDL/method names are listed in the CallStack column, and clicking on them opens their source 134 code. Elapsed times are listed for a given call stack 130 under the other columns, which are synchronization object columns, indicating the synchronization time spent by the thread in question for the synchronization objects of the designated kind. Blocking time and/or number of blocking instances may be shown. A report 408 may collate the synchronization blocking times per calling stack and then sort them according to total blocking time as well as categorizing them according to the synchronization object class involved. A report may help a developer locate substantial problems, and address them, using a hyperlink to the source code through the call stacks, for example. Integrating a report 408 within an IDE 146 allows an iterative program tuning loop within a given development environment.

In some embodiments, a visualization 160 configures a display 144 with a color-coded report 408 in which different colors correspond to different thread synchronization event categories. Graphically depicting stall regions in time using colors may help a user 104 quickly infer whether the application program 124 is wasting a significant amount of time synchronizing. "Thread synchronization event categories" include categories such as those discussed in connection with timelines legend 506, e.g., running, critical section, idle, mutex, and the like, or any subset or overlapping set thereof.

In some embodiments an integrated development environment configures the memory 112, and a report 408 or other visualization 160 is integrated with the IDE 146 for source 134 code access by a user 104. Other IDE tools, such as a debugger or profiler, may also be integrated with a thread synchronization analysis visualization 160.

In some embodiments, a visualization 160 configures a display 144 with an icon for a blocking event, and the system includes at least one blocking event details display routine in the software 152 designed to display details about a synchronization API 128, a synchronization object 132, and a call stack 130 at which the blocking event occurred. The icon can be clicked to show method and class names, version number, and other details about the synchronization API; synchronization object details such as a virtual address of a handle; and the call stack contents when the synchronization operation occurred, with a link to source code for further study.

In some embodiments, a blocking APIs 524 section recites a list of one or more blocking API identifications 162, namely, a list of API's 128 found active in call stacks of synchronization-blocked threads 126. In some embodiments, an edit API list 526 section provides a developer with a mechanism for editing a list of potential blocking APIs.

In some embodiments, peripheral equipment such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

More generally, some embodiments provide a visualization 160, with icons representing each blocking event that can be clicked on to reveal the source 134 code responsible by using call stacks 130 at the blocking event. For each blocking event, a link may be shown to the thread 126 holding the synchronization object 132 blocked on. A link may also be shown from the unblocking event to the beginning of execution of the blocked thread, with an icon showing blockage time. Time from the object release operation until the thread resumed execution may be shown, to reflect kernel 122 scheduling overheads. Some embodiments correlate execution context in the application program 124 to thread synchronization event time in the visualization 160, by exposing user instrumentation, so that developers can correlate synchronization behavior to application program phase. For example, some embodiments support user-created synchronization operations by leveraging standard (public) Windows instrumentation tools and exposing them in the visualizations 160 and reports. Some embodiments provide reports that summarize the amount of time a thread is blocked per class of synchronization object and allow a developer to drill-down by synchronization class (e.g., critical sections or monitors) to connect specific instances of synchronization in source code to cumulative delay calculations. Synchronization event analysis software 152, reports, and visualizations may be integrated with an IDE 146 in order to open the source files. Embodiments may provide some or all of these features for native Win32 application programs 124, Microsoft®.NET™ framework application programs 124 (marks of Microsoft Corporation), for programs 124 running under LINUX (mark of Linus Torvalds), Macintosh OS X (mark of Apple Computer), and other operating systems, and other application programs 124.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Methods Overview

Figure 6:
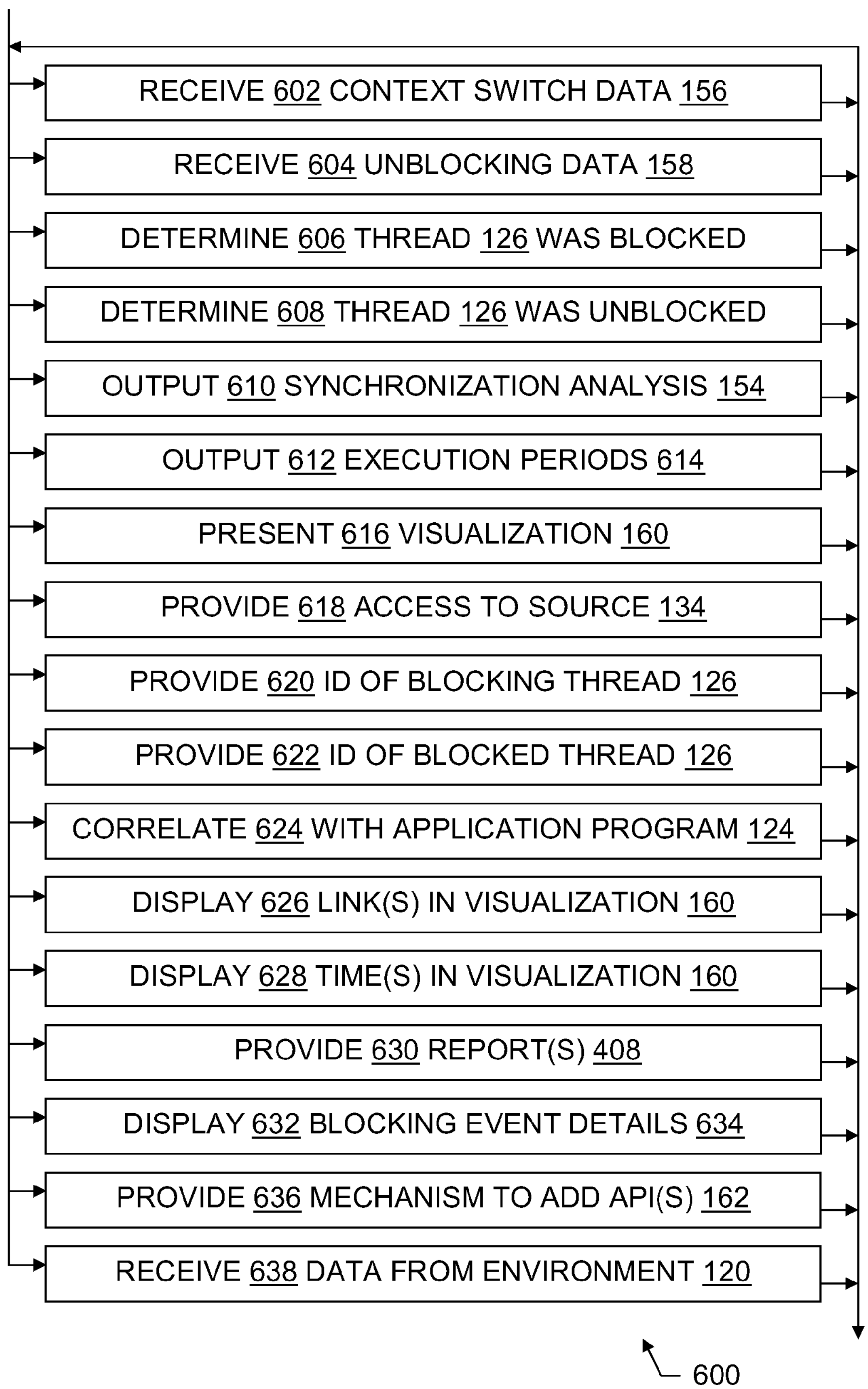
FIG. 6 is a flow chart illustrating steps of some method and configured storage medium embodiments.

FIG. 6 illustrates some method embodiments in a flowchart 600. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 600 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim. For example, some methods include a data gathering, sending output to a trace file, analysis using the data in the log file, and providing analysis results such as visualizations and reports. Some methods include consuming trace data in real-time. By way of example, reference is made below to providing particular information to developers, but steps of flowchart 600 may also be accomplished by providing the information to other users 104.

During a thread context switch data receiving step 602, synchronization event analysis software 152 receives kernel context switch data 156. Receiving step 602 may be accomplished by receiving or accessing a data log 142 in the form of a file containing context switch data 156 generated by a scheduler 138, by linking to such a file, by loading such a file, by receiving such data 156 over a network connection, or by any other data transmission mechanism.

During a thread unblocking data receiving step 604, synchronization event analysis software 152 receives thread unblocking data 158. Receiving step 604 may be accomplished by receiving or accessing a data log 142 in the form of a file containing unblocking data 158 generated by a block/unblock logger 140, by linking to such a file, by loading such a file, by receiving such data 158 over a network connection, or by any other data transmission mechanism.

During a blocked thread determining step 606, synchronization event analysis software 152 determines that a thread 126 was blocked. Determining step 606 may be accomplished by identifying within the context switch data 156 a switched-out thread 126 which was calling a synchronization blocking API and has a thread state of Not Ready.

During an unblocked thread determining step 608, synchronization event analysis software 152 determines that a thread 126 was unblocked. Determining step 608 may be accomplished by identifying within the thread unblocking data 158 a thread 126 which was unblocked by another thread's release of a synchronization object 132.

During a synchronization analysis outputting step 610, synchronization event analysis software 152 outputs a thread synchronization event analysis to a display 144, a file, a network 108, or another data destination. For example, outputting step 610 may configure a display 144 with a visualization 160 and/or may write a report 408 to a file.

During an execution period outputting step 612, synchronization event analysis software 152 outputs a visualization 160 containing thread execution periods 614. Execution periods may be output in textual and/or graphical form. Execution periods include at least thread running/not running status based on at least kernel context switch data 156. A performance of synchronization analysis outputting step 610 may include one or more performances of execution period outputting step 612.

During a visualization presenting step 616, synchronization event analysis software 152 presents a visualization 160 to a developer, e.g., by configuring a display 144 with the visualization.

During a source code access providing step 618, synchronization event analysis software 152 provides a developer with access to source 134 code for at least a portion of a thread 126.

During a blocking thread ID providing step 620, synchronization event analysis software 152 provides a developer with a thread number, thread name, thread address, and/or other identification of a blocking thread 126. The blocking thread may be identified from the thread unblocking data 158, for example.

During a blocked thread ID providing step 622, synchronization event analysis software 152 provides a developer with a thread number, thread name, thread address, and/or other identification of a blocked thread 126. The blocked thread may be identified from the thread context switch data 156, for example.

During a correlating step 624, synchronization event analysis software 152 correlates thread synchronization with application program 124 execution in a visualization 160. For example, a correlating step 624 may produce a visualization having program events shown on a horizontal time axis by vertical bars, icons, or other graphical elements in relation to thread execution periods.

During a link displaying step 626, synchronization event analysis software 152 displays one or more links in a visualization 160. For instance, for each blocking event in a visualization, a link may be displayed from the blocking event to the thread holding the synchronization object blocked on. As another example, a link may be displayed from an unblocking event to the beginning of execution of the blocked thread.

During a time displaying step 628, synchronization event analysis software 152 displays one or more time values in a visualization 160. For instance, a reference timeline such as timeline 522 may be displayed with execution periods 614 in a visualization 160, and/or delay periods may be summarized in a table or other listing of statistics 510.

During a report providing step 630, synchronization event analysis software 152 provides a developer with one or more reports 408. Reports may be provided on a display 144, in a file, over a network, or in other computer-readable and/or human-perceptible forms.

During a blocking event detail displaying step 632, synchronization event analysis software 152 displays for a developer one or more details 634 associated with a synchronization blocking event, such as the thread identities, synchronization object, APIs, source code, and/or times involved.

During a potential blocking API edit mechanism providing step 636, synchronization event analysis software 152 provides a developer with drop-down lists of APIs, text entry boxes, and/or other mechanisms for editing a list of potential blocking API identifications 162.

During a managed environment data receiving step 638, synchronization event analysis software 152 receives 602 context switch data 156 and/or receives 604 thread unblocking data 158 for threads 126 which executed in a managed code multi-threaded environment 120.

Some embodiments provide a method which may be used by a developer to help analyze thread synchronization events. The method includes receiving 602 the following data 156 for each of a plurality of thread context switches: switched-in thread identity 202, switched-out thread identity 204, switched-out thread state 206, and at least one thread call stack 130. The method also includes determining 606 with the data 156 that a particular switched-out thread 126 was synchronization-blocked; as used here, "with" means at least a portion of the data 156 is necessary for the determination but is not necessarily sufficient, since API 128 signatures in the call stack 130 may be used as well in determining that a thread was blocked. The method also includes outputting 610 a thread synchronization event analysis 154 listing the particular switched-out thread as a blocked thread and listing an indication 410 of a blocking API based on the particular thread call stack 130 and a collection of blocking API identifications 162.

In some embodiments, the method includes determining 608 that a particular thread 126 was synchronization-unblocked, and outputting 610 a thread synchronization event analysis listing the particular thread as an unblocked thread and listing a corresponding unblocking thread. In some, the method includes receiving 602 context switch times of occurrence 208, receiving 604 unblocking event times of occurrence 308, and outputting 612 thread execution periods based on at least some of the times of occurrence.

In some embodiments, the method includes presenting 616 a visualization 160 of the thread synchronization event analysis 154. In some, the visualization 160 provides 618 a user 104 with interactive access to a source 134 code that is responsible for a thread blocking synchronization event. In some embodiments, the visualization 160 provides 620 a user 104 with an identification or other indication 410 of a blocking thread 126 which holds a synchronization object 132 that is blocked on in a thread blocking synchronization event, e.g., by displaying a link 514 between the blocked thread and the thread holding the synchronization object.

In some embodiments, a visualization 160 correlates 624 thread synchronization event occurrence times with an instrumentation of an application program. Execution context in the application may be correlated with time on the visualization by graphically exposing user instrumentation events (e.g., by vertical bars as noted above), allowing developers to match synchronization behaviors to application program phases.

Analysis Example

Another example of thread synchronization analysis proceeds as follows. Assume a thread X is running. X acquires a lock, and then X does some work. A scheduler 138 switches X out from the processor 110, and switches thread Y in to run on the processor. X's state 206 is still Ready so the context switch from X to Y is not a blocking event and is not a synchronization event. Thread Y makes an API call GetLock( ) trying to acquire the lock, but X still has the lock. The scheduler switches Y out and switches a thread Z in. Y's state is Not Ready and GetLock( ) in Y's call stack 130 is recognized as a synchronization-blocking API from a list of blocking API identifications 162, so this context switch is a synchronization event. Because Y is the switched-out thread calling a synchronization-blocking API and because Y's state is not ready, Y is the blocked thread in this synchronization event.

Next, thread Z runs and does some work. Z makes a FileRead( ) call. The scheduler switches Z out and switches X back in. Thread Z's state is Not Ready so this context switch is also a blocking event, but FileRead( ) in Z's call stack is not recognized as a synchronization-blocking API so this is not a synchronization event. Thread X runs, and at some point X releases the lock with a ReleaseLock( ) call. A kernel event is generated when Thread X releases the lock and the event relating X and Y is logged into the data logs 142 by the block/unblock logger 140. By releasing the lock, X, makes thread Y ready to execute again. The scheduler switches X out, and switches Y back in. GetLock( ) in Y's call stack is recognized as a synchronization-blocking API, so this is a synchronization event; Y is the unblocked thread.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using components such as a report 408 or other thread synchronization event analysis 154, synchronization event analysis software 152, and/or data logs 142, for example, in the form of corresponding data 118 and instructions 116, read from a removable medium 114 and/or another source such as a network connection, to thereby form a configured medium in the form of configured memory 112 which is capable of causing a computer system to perform method steps for synchronization analysis as disclosed herein. FIGS. 1 through 5 thus help illustrate configured storage media embodiments and method embodiments, as well as system embodiments.

Some embodiments provide a storage medium 114 configured with computer data 118 and computer instructions 116 for a method which may be used by a developer to help analyze thread synchronization events. The method includes receiving 602 the following data 156 for each of a plurality of thread context switches: switched-in thread identity 202, switched-out thread identity 204, switched-out thread state 206, at least one thread call stack 130, context switch time of occurrence 208. The method also includes receiving 604 the following data 158 for each of a plurality of kernel thread unblocking synchronization events: unblocked thread identity 302, unblocking thread identity 304, at least one thread call stack 130, unblocking synchronization event time of occurrence 308. The method also includes determining 606 with the data 156, 158 that a particular thread 126 was synchronization-blocked and subsequently synchronization-unblocked, and outputting 610 a thread blocking synchronization event analysis 154 based on the data.

In some embodiments, the method further includes providing 636 a mechanism 164 for a user 104 to identify at least one API 128 which is to be treated as a synchronization blocking API during the determining step. Thus, a user can provide the synchronization event analysis software 152 with a list of APIs that should be considered blocking synchronization APIs so those APIs can be indicated the synchronization analysis 154, in visualizations 160, and in reports 408.

In some embodiments, the method includes outputting 610 a thread blocking synchronization analysis 154 which identifies an inter-thread synchronization dependency. For example, if a thread was blocked the dependency shows which thread unblocked it, based on thread unblocking data 158.

In some embodiments, the method includes receiving 602, 604 data 156, 158 for threads 126 which executed in a managed code multi-threaded environment 120.

In some embodiments, the method includes presenting 616 a visualization 160 of thread synchronization events, and the visualization provides at least one of the following: interactive access to source code responsible for a thread blocking synchronization event, an identification of a thread which holds a synchronization object that is blocked on in a thread blocking synchronization event, thread execution periods based on when a thread is unblocked and when a thread is context switched-in.

More generally, any of the method steps illustrated in FIG. 6, or otherwise taught herein, may be used to help configure a storage medium to thereby form a configured medium embodiment.

Additional Examples

As a context for some additional examples, assume that the following data is available for use by synchronization event analysis software 152:

An operating system scheduler 138 event log 142 of context switches showing the new state 206 of the preempted thread 126, the identity 204 of the thread, and the time 208 at which the event took place.

Call stacks 130 for the thread 126 being blocked in the context switch event log.

An operating system event log 142 (not necessarily stored in the same file as the scheduler log 142) showing when a thread unblocks a thread blocked on a synchronization event, and also showing the identities 302, 304 of the two threads involved and the time 308 at which the event took place.

Call stack 130 of the thread that unblocks another thread in the unblocking event log.

For example, the context switch data 156 and the thread unblocking data 158 already exist internally in some Microsoft operating systems, and can be made available to software 152 by the addition of an appropriate API 128, e.g., via a debugger. One or more APIs to support the software 152 could be published by a kernel, allowing the software 152 to know when a context switch happens as an operating system (kernel) event, to get the call stack 130, and to identify ReadyThread interthread synchronization dependencies.

With regard to methodology, given the above data 156, 158, a synchronization blocking view in a report or other visualization can be populated by creating a list of all execution periods 614 for each thread 126 of interest. At the end of each execution period, one embodiment of software 152 examines the call stack of the blocked thread when its new state is not ready. Upon encountering a signature of a synchronization blocking API in the call stack, the software 152 attributes the blocking event, as well as the duration of the delay and the associated call stack, to a class of synchronization objects 132 for the blocked thread in question.

Conversely, when this embodiment of the software 152 encounters an unblocking event, the software 152 notes the two threads involved as well as the call stack 130 of the thread that released the blocked thread, namely, the blocking thread. The software 152 then saves the unblocking event's data for both threads involved.

In some embodiments, other features are supported. Some embodiments provide a simple API for developers to generate events from their application programs 124 which can be depicted on the visualization to illustrate to the user which phase of the application's execution the events occurred in. Some embodiments provide a mechanism 164 for users to provide a list of APIs that should be considered blocking synchronization APIs so that they may be used in the analysis, visualizations, and reports.

With regard to visualizations, in some embodiments software 152 generates a synchronization delay visualization by iterating over all the execution periods and synchronization blocking and unblocking events per thread. An execution period is depicted in some embodiments as a rectangle whose length is determined by the duration of execution (along the x-axis). At the end of each execution period, the software 152 will identify the reason for the delay, and if it is due to synchronization, will depict that reason visually using an icon. The icon may be hovered over or clicked to display details about the synchronization API, the delay duration (in seconds), and the call stack of the blocked thread. The idle period will be categorized using a color map to visually depict the type of synchronization delay encountered by each thread. When a thread blocked on synchronization resumes again, the software 152 will look for a corresponding unblocking event and draw a line or arrow in the visualization 160 between the thread lanes of the blocked and blocking threads, as shown for example in FIG. 5. The delay from the unblocking event until the blocked thread resumes execution is also noted in some visualizations 160, and may be explicitly shown using an icon at the beginning of the next execution period. If the unblocking event occurs due to a thread from a process that is not being depicted in the displayed view, some embodiments do not show the line/arrow but instead place an icon that identifies the blocking thread involved and its call stack if available.

User events, if available in the event log, may be shown on the visualization in order to indicate the phase in which the application program 124 was executing when a synchronization event took place. In some embodiments, these user events are shown as vertical bars that are perpendicular to the time axis (usually the x-axis).

With regard to reports, some embodiments of software 152 have a list of each synchronization blocking event, the API at which the thread blocked, and the delays incurred due to these blocking events. Accordingly, some embodiments generate reports 408 that summarize the synchronization delays encountered by a thread (or aggregated across a process) and accumulate or breakdown the results according to locations in code and/or the type of synchronization operation involved. Various report formats are possible, including some resembling output from a typical execution profiler would display, but the metric used in a report 408 is synchronization delay rather than execution time.

CONCLUSION

Some embodiments described herein relate to parallel performance tools, namely, tools designed to help developers reduce inefficiencies caused by synchronization overheads. Visualization and reporting tools may quickly point a developer to the location of a problem in source code. Synchronization event analysis software 152 can be linked to source code editors, and may be part of an Integrated Development Environment such as the Microsoft® Visual Studio® IDE. In a given embodiment, for example, the synchronization event analysis software may provide a visualization which does the following:

Graphically depicts stall regions in time using colors so that a user may quickly infer whether the application is wasting a significant amount of time synchronizing.

Graphically shows icons at each synchronization blocking event. The icon can be clicked to show details about the synchronization API, the synchronization object (e.g., virtual address of handle), and the call stack at which the synchronization operation occurred, with a hyperlink or other easy access to source code for further study.

Graphically shows markers (e.g., vertical bars) that correlate application instrumentation with a thread timeline view.

Graphically links a blocked thread with the thread holding the synchronization object, when applicable.

Although particular embodiments are expressly illustrated and described herein as methods, configured media, or systems, it will be appreciated that discussion of one type of embodiment also generally extends to other embodiment types. For instance, the descriptions of methods in connection with FIG. 6 also help describe configured media, as well as the operation of systems like those described in connection with FIGS. 1 through 5. It does not follow that limitations from one embodiment are necessarily read into another. In particular, methods are not necessarily limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method which may be used by a developer to help analyze thread synchronization events, the method comprising the steps of:

receiving the following data for each of a plurality of thread context switches: switched-in thread identity, switched-out thread identity, switched-out thread state, at least one thread call stack;

determining with the data that a particular switched-out thread was synchronization-blocked; and outputting a thread synchronization event analysis listing the particular switched-out thread as a blocked thread and listing an indication of a blocking API based on the particular thread call stack and a collection of blocking API identifications, "API" being an acronym for Application Program Interface, wherein the thread synchronization event analysis configures a display with a visible link between (i) an icon representing an unblocking event within a first thread timeline and (ii) a second thread timeline representing a thread which is unblocked by the event, and wherein the first and second timelines are separated in the display by at least one other timeline.

2. The method of claim 1, further comprising:

determining that a particular thread was synchronization-unblocked; and outputting a thread synchronization event analysis listing the particular thread as an unblocked thread and listing a corresponding unblocking thread.

3. The method of claim 2, wherein the method further comprises receiving context switch times of occurrence and receiving unblocking event times of occurrence, and the method also outputs thread execution periods based on at least some of the times of occurrence.

4. The method of claim 1, further comprising presenting a visualization of the thread synchronization event analysis.

5. The method of claim 4, wherein the visualization provides a user with interactive access to source code responsible for at least one of: a thread blocking synchronization event, a thread unblocking synchronization event.

6. The method of claim 4, wherein the visualization provides a user with an identification of a blocking thread which holds a synchronization object that is blocked on in a thread blocking synchronization event.

7. The method of claim 4, wherein the visualization correlates thread synchronization event occurrence times with an instrumentation of an application program.

8. A computer system configured to assist analysis of thread synchronization events, the system comprising:

a memory;

a logical processor in operable communication with the memory;

a display in operable communication with the memory and the processor;

thread context switch data produced by a kernel thread scheduler;

thread unblocking data; and software which receives the following data for each of a plurality of thread context switches: switched-in thread identity, switched-out thread identity, switched-out thread state, at least one thread call stack;

determines with the data that a particular switched-out thread was synchronization-blocked; and outputs a thread synchronization event analysis listing the particular switched-out thread as a blocked thread and listing an indication of a blocking API based on the particular thread call stack and a collection of blocking API identifications, a visualization of the thread context switch data and the thread unblocking data which configures the display and shows thread blocking and thread unblocking synchronization events, the visualization containing a visible link between (i) an icon representing an unblocking event within a first thread timeline and (ii) a second thread timeline representing a thread which is unblocked by the event, the visualization correlating thread synchronization event occurrence times with an instrumentation of an application program.

9. The system of claim 8, wherein the visualization configures the display with an icon for a blocking event, and the system further comprises at least one source code display routine designed to display source code responsible for the blocking event after a user selects the icon.

10. The system of claim 8, wherein the visualization configures the display with a visible link between a blocking event and a thread which holds a synchronization object that is blocked on.

11. The system of claim 8, wherein the visualization configures the display with a visible link between an unblocking event and a thread which is unblocked by the event, and with an indication of how much time passed between the unblocking event and the thread resuming execution.

12. The system of claim 8, wherein the visualization configures the display with a report summarizing the amount of time a thread is blocked, subdivided by at least one of: synchronization object category, call stack.

13. The system of claim 8, wherein the visualization configures the display with a color-coded report in which different colors correspond to different thread synchronization event categories.

14. The system of claim 8, further comprising an integrated development environment configuring the memory, wherein the visualization is integrated with the integrated development environment for source code access by a user.

15. The system of claim 8, wherein the visualization configures the display with an icon for a blocking event, and the system further comprises at least one blocking event details display routine designed to display details about a synchronization API, a synchronization object, and a call stack at which the blocking event occurred, "API" being an acronym for Application Program Interface.

16. A storage medium configured with computer data and computer instructions for a method which may be used by a developer to help analyze thread synchronization events, the method comprising the steps of:

receiving the following data for each of a plurality of thread context switches: switched-in thread identity, switched-out thread identity, switched-out thread state, at least one thread call stack, context switch time of occurrence;

receiving the following data for each of a plurality of kernel thread unblocking synchronization events: unblocked thread identity, unblocking thread identity, at least one thread call stack, unblocking synchronization event time of occurrence;

determining with the data that a particular thread was synchronization-blocked and subsequently synchronization-unblocked; and outputting a thread blocking synchronization event analysis based on the data, the thread blocking synchronization analysis identifying an inter-thread synchronization dependency, namely, identifying for two threads which of the threads unblocked the other thread, the thread blocking synchronization analysis containing a link between (i) an unblocking event within a first thread timeline and (ii) a second thread timeline representing a thread which is unblocked by the event.

17. The configured medium of claim 16, wherein the method further comprises providing a mechanism for a user to identify at least one API which is to be treated as a synchronization blocking API during the determining step, "API" being an acronym for Application Program Interface.

18. The configured medium of claim 16, wherein the method comprises receiving data for threads which executed in a managed code multi-threaded environment.

19. The configured medium of claim 16, wherein the method further comprises presenting a visualization of thread synchronization events, and the visualization provides at least one of the following: interactive access to source code responsible for a thread blocking synchronization event, an identification of a thread which holds a synchronization object that is blocked on in a thread blocking synchronization event, thread execution periods based on when a thread is unblocked and when a thread is context switched-in.

20. The system of claim 8, further comprising a mechanism for a user to identify at least one API which is to be treated as a synchronization blocking API in the visualization, "API" being an acronym for Application Program Interface.

* * * * *